United States Patent
Shimbo et al.

(10) Patent No.: US 11,601,024 B2
(45) Date of Patent: Mar. 7, 2023

(54) ROTATING ELECTRICAL MACHINE

(71) Applicant: TDK Corporation, Tokyo (JP)

(72) Inventors: Nobuyuki Shimbo, Tokyo (JP); Koji Mitake, Tokyo (JP)

(73) Assignee: TDK Corporation, Tokyo (JP)

( * ) Notice: Subject to any disclaimer, the term of this patent is extended or adjusted under 35 U.S.C. 154(b) by 44 days.

(21) Appl. No.: 16/869,063

(22) Filed: May 7, 2020

(65) Prior Publication Data

US 2020/0366145 A1  Nov. 19, 2020

(30) Foreign Application Priority Data

May 17, 2019 (JP) ............... JP2019-094076

(51) Int. Cl.
*H02K 1/27* (2022.01)
*H02K 21/14* (2006.01)
*H02K 1/276* (2022.01)

(52) U.S. Cl.
CPC ............. *H02K 1/276* (2013.01); *H02K 21/14* (2013.01)

(58) Field of Classification Search
CPC ........ H02K 1/276; H02K 21/14; H02K 21/16; H02K 1/2766; H02K 1/02
USPC .................................................... 310/156.56
See application file for complete search history.

(56) References Cited

U.S. PATENT DOCUMENTS

| | | | | |
|---|---|---|---|---|
| 5,508,576 A | * | 4/1996 | Nagate | H02K 15/03 310/156.54 |
| 8,922,083 B2 | * | 12/2014 | Asahi | H02K 1/30 310/156.08 |
| 9,502,929 B2 | * | 11/2016 | Yamada | H02K 21/044 |
| 9,806,569 B2 | * | 10/2017 | Yokota | H02K 1/278 |
| 2006/0170301 A1 | * | 8/2006 | Masuzawa | H02K 15/03 310/156.53 |
| 2010/0187940 A1 | * | 7/2010 | Yamamoto | H02K 3/50 310/201 |
| 2014/0368077 A1 | * | 12/2014 | Yokota | H02K 19/12 310/181 |
| 2017/0201166 A1 | * | 7/2017 | Ogawa | H02K 7/083 |
| 2017/0288483 A1 | * | 10/2017 | Lee | H02K 1/2766 |
| 2018/0115206 A1 | * | 4/2018 | Okumura | H01F 1/053 |
| 2021/0152061 A1 | * | 5/2021 | Nishikawa | B08B 5/04 |

FOREIGN PATENT DOCUMENTS

| | | | |
|---|---|---|---|
| CN | 202721584 U | | 2/2013 |
| CN | 108768011 A | * | 11/2018 |
| JP | 2000-134842 A | | 5/2000 |
| JP | 2008-167520 A | | 7/2008 |
| JP | 2015-061388 A | | 3/2015 |
| JP | 6545385 B2 | * | 7/2019 ............. H02K 1/02 |
| KR | 102347870 B1 | * | 1/2022 |

* cited by examiner

*Primary Examiner* — Alex W Mok
(74) *Attorney, Agent, or Firm* — Faegre Drinker Biddle & Reath LLP

(57) ABSTRACT

In an IPM motor, since an end surface portion which is a pressed powder compact made of soft magnetic powder has a higher electrical resistivity than an electrical resistivity of a main body portion made of a laminated steel sheet, compared to when the electrical resistivity of the end surface portion is the same as the electrical resistivity of the main body portion, the occurrence of an eddy current in the end surface portion is further prevented. For this reason, in the IPM motor, a deterioration in efficiency caused by an eddy current loss is prevented, and an improvement in efficiency is realized.

2 Claims, 6 Drawing Sheets

ROTATING ELECTRICAL MACHINE

CROSS-REFERENCE TO RELATED APPLICATIONS

This application is based upon and claims the benefit of priority from Japanese Patent Application No. 2019-94076, filed on 17 May 2019, the entire contents of which are incorporated herein by reference.

TECHNICAL FIELD

The present disclosure relates to a rotating electrical machine.

BACKGROUND

In the related art, as a rotating electrical machine, there is known an IPM motor which is one type of inner rotor type motor and in which permanent magnets are embedded in a rotor (for example, Japanese Unexamined Patent Publication No. 2000-134842).

SUMMARY

In the foregoing IPM motor, a coil is wound on a stator in an axial direction of a rotor, and thus a dead space is likely to be formed in the vicinity of an end portion of the rotor. Therefore, in order to improve motor characteristics, it is considered that the length of the rotor is designed to be longer than the length of the stator so that an end surface of the rotor protrudes further than an end surface of the stator. In such a configuration, a magnetic flux having a component perpendicular to the end surface of the rotor is likely to occur in an end surface portion of the rotor, and when such a magnetic flux fluctuates, an eddy current occurs in the end surface portion of the rotor. As a result, a deterioration in motor efficiency may be caused by an eddy current loss.

As a result of intensive research, the inventors have newly found a technique capable of improving the motor efficiency in the configuration where the end surface portion of the rotor protrudes further than the end surface of the stator.

According to the present disclosure, there is provided a rotating electrical machine with improved efficiency.

According to one aspect of the present disclosure, there is provided a rotating electrical machine having a rotor rotatable around a predetermined axis and a stator. In the rotating electrical machine, one of the rotor and the stator includes a magnet holding portion and the other includes a coil holding portion. A plurality of permanent magnets are placed in the magnet holding portion and a plurality of coils are placed in the coil holding portion. Each of the permanent magnets extends over an entire length of the magnet holding portion in an axial direction of the rotor. An end surface of the magnet holding portion protrudes further than an end surface of the coil holding portion in the axial direction of the rotor. The magnet holding portion includes a main body portion and an end surface portion. The main body portion holds each of the permanent magnets. The end surface forms the end surface of the magnet holding portion, the permanent magnets exposed in the end surface. At least a first portion of the end surface portion which is positioned between the permanent magnet and an air gap between the rotor and the stator as seen from the axial direction of the rotor has a higher electrical resistivity than an electrical resistivity of the main body portion.

In the rotating electrical machine, since the at least first portion (namely, a portion between the permanent magnet and the air gap between the rotor and the stator) of the end surface portion of the magnet holding portion has a higher electrical resistivity than the electrical resistivity of the main body portion, compared to when the electrical resistivity of the first portion of the end surface portion is the same as the electrical resistivity of the main body portion, the occurrence of an eddy current in the end surface portion is further prevented. For this reason, in the rotating electrical machine, a deterioration in efficiency caused by an eddy current loss is prevented, and an improvement in efficiency can be attained.

In the rotating electrical machine according to another aspect, the main body portion of the magnet holding portion is made of a laminated steel sheet in which a plurality of silicon steel sheets are stacked one on another in the axial direction of the rotor, and the at least first portion of the end surface portion is a pressed powder compact made of soft magnetic powder.

In the rotating electrical machine according to still another aspect, an entirety of the end surface portion of the magnet holding portion is the pressed powder compact.

DETAILED DESCRIPTION

Figure 1:
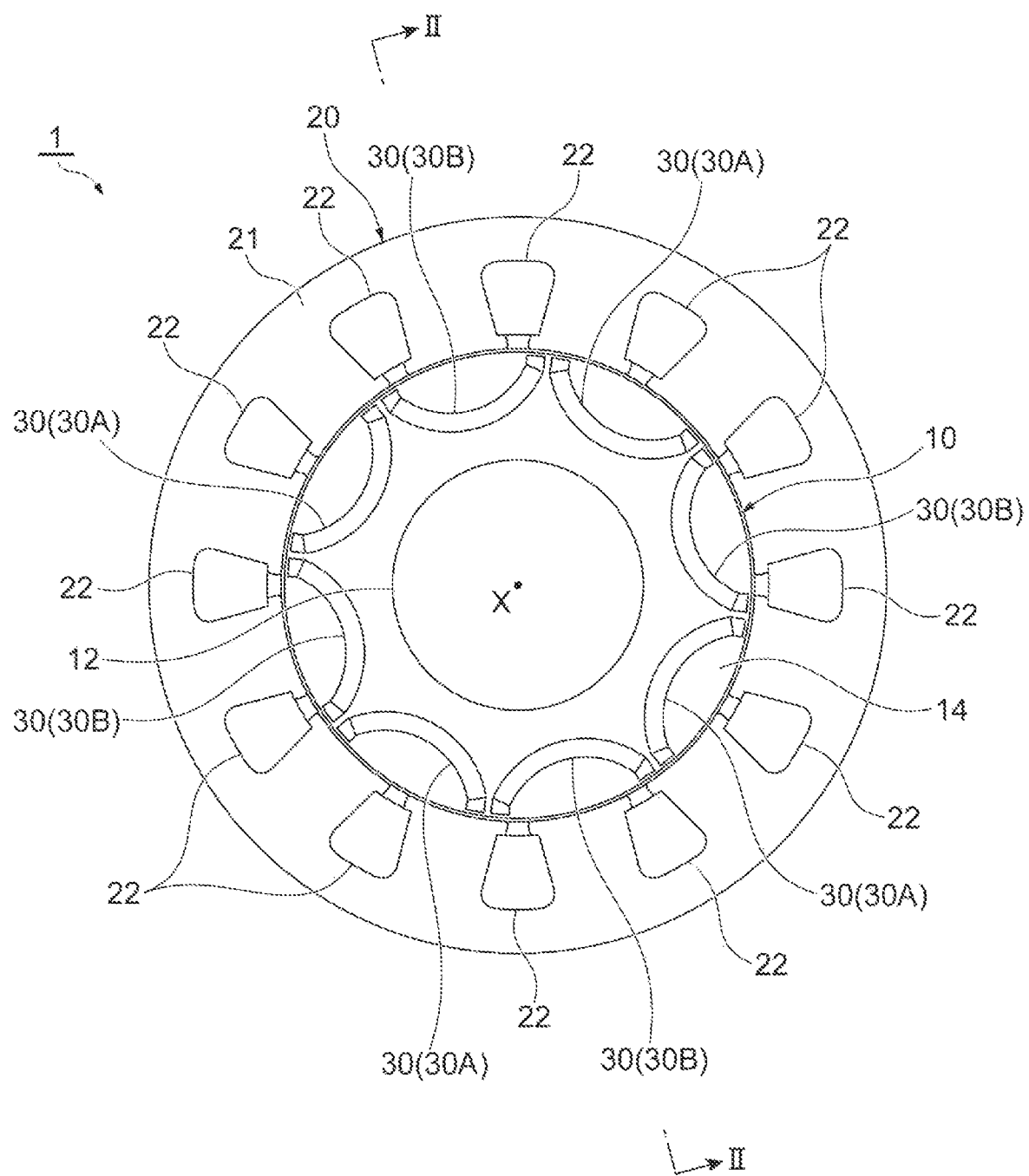
FIG. 1 is a schematic plan view illustrating an IPM motor according to one embodiment.

Hereinafter, various embodiments and examples will be described with reference to the drawings. Incidentally, in the drawings, the same reference signs will be assigned to the same or equivalent portions, and duplicated descriptions will be omitted.

In the following embodiment, a motor (more specifically, IPM motor) will be described as an example of a rotating electrical machine. FIG. 1 illustrates an IPM motor 1 according to an embodiment. FIG. 1 illustrates a plan view of the IPM motor 1 as seen from the direction of an axis X. The IPM motor 1 is an inner rotor type motor which includes a rotor 10 and a stator 20 and in which the rotor 10 is positioned inside the stator 20. The IPM motor 1 has an 8-pole and 12-slot configuration.

The rotor 10 is configured to include a shaft 12 and a rotor core 14 (magnet holding portion).

The shaft 12 has a columnar shape, and extends in a direction perpendicular to the sheet of FIG. 1. The shaft 12 is made of, for example, a stainless steel or the like.

The rotor core 14 has a cylindrical shape, and includes a shaft hole 14a on the inside thereof. The shaft 12 is fitted into the shaft hole 14a of the rotor core 14, and the rotor core 14 and the shaft 12 integrally rotate around the axis X. In the present embodiment, the rotor core 14 has an outer diameter of 158.4 mm and an inner diameter of 85 mm. In addition, a width W1 (namely, a length in the direction of the axis X) of the rotor core 14 is 51.6 mm.

Figure 2:
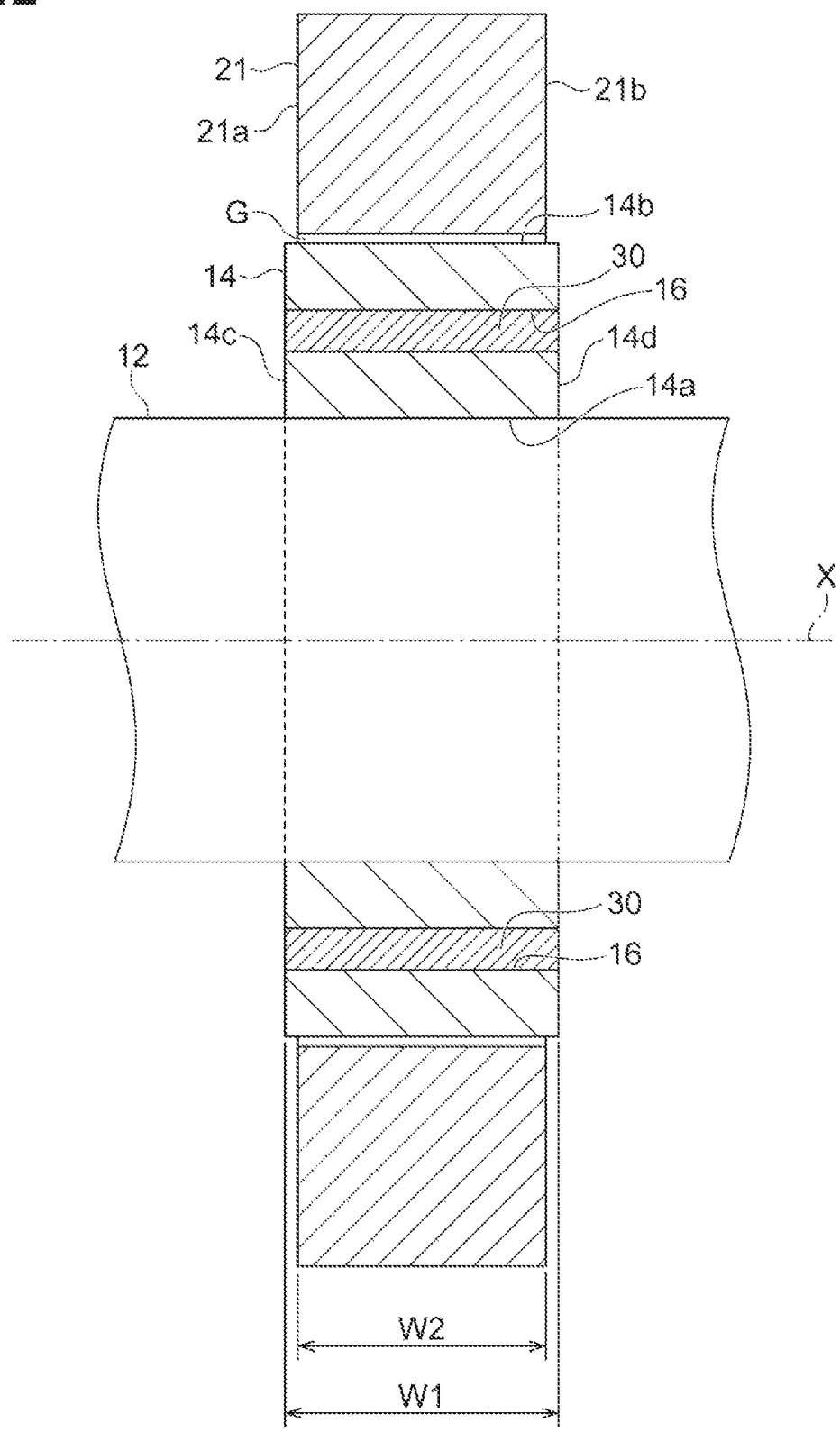
FIG. 2 is a cross-sectional view of the IPM motor illustrated in FIG. 1 as taken along a line II-II.

As illustrated in FIGS. 1 and 2, a plurality of permanent magnets 30 are placed in the rotor core 14. The plurality of permanent magnets 30 can be permanent magnets made of the same material. In the present embodiment, each of the permanent magnets 30 is a rare earth permanent magnet, for example, a neodymium-based sintered magnet. Each of the permanent magnets 30 may be sintered magnets other than the neodymium-based sintered magnet, and may be magnets (for example, a bonded magnet, a hot-worked magnet, and the like) other than the sintered magnet.

Each of the permanent magnets 30 is accommodated in a magnet hole 16 extending parallel to the axis X of the rotor 10. The inner dimension of the magnet hole 16 is designed to be slightly larger than the external dimension of the permanent magnet 30 to be described later. For this reason, the position or the posture of the permanent magnet 30 is not changed in the magnet hole 16.

In the present embodiment, the rotor 10 includes eight permanent magnets 30 having the same shape, and the eight permanent magnets 30 are configured such that pairs of the permanent magnets 30 are disposed at equal angular intervals with respect to the axis X. All of the permanent magnets 30 have an arch shape (or a C-shape) as an end surface shape and a cross-sectional shape as seen from the direction of the axis X, and are disposed such that inner arc sides of the permanent magnets 30 face an outer peripheral surface 14b of the rotor core 14. All of the permanent magnets 30 are radially oriented, and N-pole magnets 30A having N poles on the inner arc sides and S-pole magnets 30B having S poles on the inner arc sides are alternately disposed around the axis X. In the present embodiment, the permanent magnets 30 are not exposed to the outer peripheral surface 14b of the rotor core 14, and are positioned slightly inward from the outer peripheral surface 14b. In the present embodiment, the permanent magnet 30 has a cross-sectional shape where the radius of curvature of the outer arc is 35 mm, the radius of curvature of the inner arc is 28.7 mm, and the opening angle is 100°.

The permanent magnet 30 is disposed in the magnet hole 16 of the rotor core 14 such that an extending direction of the permanent magnet 30 is parallel to the axis X of the rotor 10. As illustrated in FIG. 2, the magnet hole 16 and the permanent magnet 30 extend over the entire length of the rotor core 14 in the direction of the axis X. The length of the permanent magnet 30 in the extending direction is substantially the same as the width W1 of the rotor core 14, and is 51.6 mm in the present embodiment.

The stator 20 includes a stator core 21 (coil holding portion) that has a cylindrical shape and is provided to surround an outer periphery of the rotor 10. An air gap G (a width of 0.8 mm as one example) having a uniform width is provided between the rotor 10 and the stator 20. A plurality of (twelve in the present embodiment) coils 22 are disposed on an inner peripheral side of the stator core 21. The plurality of coils 22 are disposed at equal angular intervals with respect to the axis X of the rotor 10. When a three-phase alternating current voltage is applied to the plurality of coils 22 from an inverter circuit or the like (not illustrated), a rotating magnetic field occurs on the inner peripheral side of the stator core 21. In the present embodiment, the stator core 21 has an outer diameter of 250 mm and an inner diameter of 160 mm. In addition, a width W2 (namely, a length in the direction of the axis X) of the stator core 21 is 47.6 mm.

Figure 3:
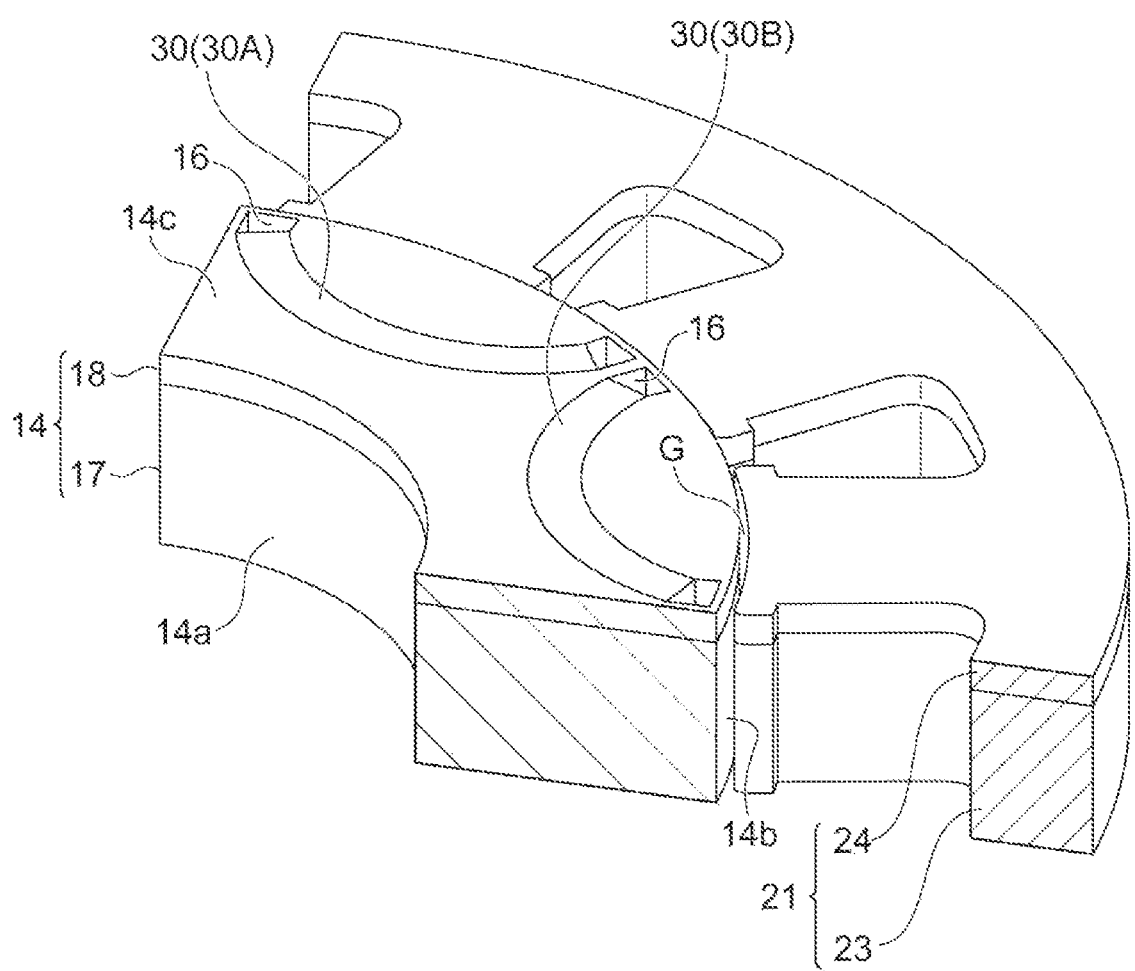
FIG. 3 is a schematic perspective view of main parts of the IPM motor illustrated in FIG. 1.
Figure 4:
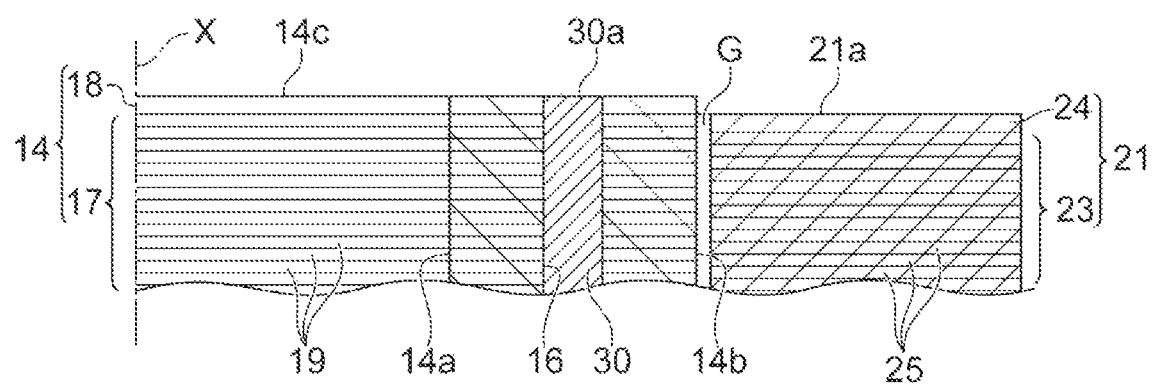
FIG. 4 is a side view of the main parts of the IPM motor illustrated in FIG. 3.
Figure 5:
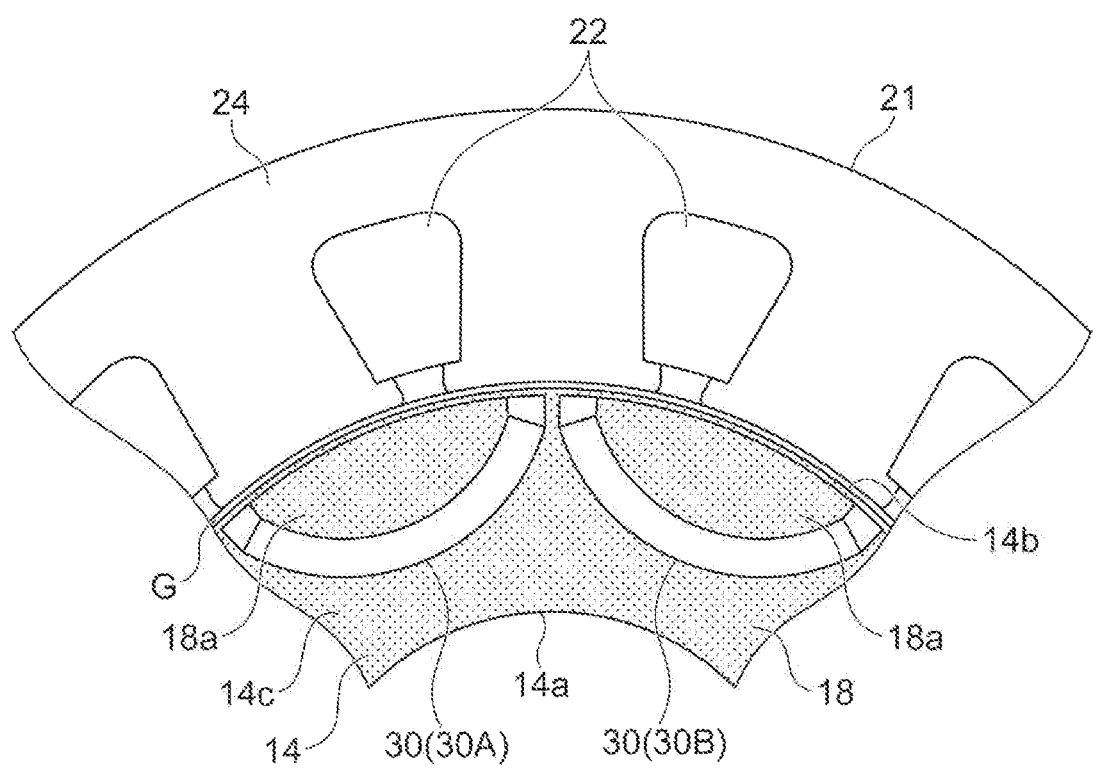
FIG. 5 is a plan view of the main parts of the IPM motor illustrated in FIG. 3.

As illustrated in FIGS. 3 to 5, the rotor core 14 includes a main body portion 17 that holds the permanent magnets 30, and an end surface portion 18 that forms each of end surfaces 14c and 14d of the rotor core, to which end surfaces 30a of the permanent magnets 30 are exposed.

The main body portion 17 is made of a laminated steel sheet in which a plurality of steel sheets 19 are stacked one on another in the direction of the axis X. The thickness of each of the steel sheets 19 is, for example, from 0.2 to 0.5 mm A silicon steel sheet can be applied as the steel sheet 19. When the main body portion 17 is made of a laminated silicon steel sheet, the main body portion 17 has an electrical resistivity of approximately $5.6 \times 10^{-7}$ Ωm.

The end surface portion 18 is a pressed powder compact made of soft magnetic powder. Pure iron-based magnetic powder such as $Fe_3Si$ powder can be applied as the soft magnetic powder of the pressed powder compact. An average grain size (d50) of the soft magnetic powder of the pressed powder compact is, for example, from 20 to 100 µm. The pressed powder compact is obtained by binding the soft magnetic powder, and a binder such as a resin can be used for binding. The pressed powder compact can be obtained by hot compaction using the soft magnetic powder. When the end surface portion 18 is a pressed powder compact made of $Fe_3Si$ powder, the end surface portion 18 has an electrical resistivity of approximately 300 Ωm.

Here, in the IPM motor 1, the width W1 of the rotor core 14 is widened to increase the volume of the magnetic material of the rotor core 14 and improve motor characteristics. In addition, as a result of widening the width W1 of the rotor core 14, the width W1 of the rotor core 14 becomes wider than the width W2 of the stator core 21, and both end surfaces 14c and 14d of the rotor core 14 protrude 2 mm further than end surfaces 21a and 21b of the stator core 21 in the direction of the axis X.

The inventors have found that in the foregoing configuration, a magnetic flux having a component perpendicular to the end surface of the rotor core (namely, a component parallel to the axis X) is likely to occur in the end surface portion 18 of the rotor core 14. It is considered that the reason is that the direction of a magnetic flux toward the stator core 21 from portions of the permanent magnets 30 which protrude further than the end surfaces 21a and 21b of the stator core 21 is inclined with respect to a direction parallel to the steel sheets 19 (namely, a direction perpendicular to the axis X). For this reason, the magnetic flux having the component perpendicular to the end surface 14c of the rotor core changes in the end surface portion 18 of the rotor core 14, so that an eddy current is likely to occur. Particularly, the eddy current is likely to occur in a first portion 18a that is positioned between the permanent magnet 30 and the air gap G between the rotor and the stator as seen from the direction of the axis X. When the eddy current occurs in the rotor core 14, a deterioration in motor efficiency may be caused by an eddy current loss.

In the IPM motor 1 described above, since in the rotor core 14, the end surface portion 18 which is a pressed powder compact made of soft magnetic powder has a higher electrical resistivity than the electrical resistivity of the main body portion 17 made of a laminated steel sheet, compared to when the electrical resistivity of the end surface portion 18 is the same as the electrical resistivity of the main body portion 17 (for example, the entirety of the rotor core 14 is made of a laminated steel sheet), the occurrence of an eddy current in the end surface portion 18 is further prevented. For this reason, in the IPM motor 1, a deterioration in efficiency caused by an eddy current loss is prevented, and an improvement in efficiency is realized.

As a result of calculating an eddy current loss using commercially available finite element software for magnetic field analysis in an IPM motor in which the end surface portion 18 (with a thickness of 4 mm) was a pressed powder compact as with the IPM motor 1 described above, it was confirmed that the eddy current loss at a rotation speed of 1,500 rpm was a value much smaller than 0.1 W and was in a negligible level. On the other hand, also in an IPM motor of which the configuration was different from that of the IPM motor 1 described above only in that the end surface portion 18 (a thickness of 4 mm) was made of a laminated steel sheet, as a result of calculating an eddy current loss using the same finite element software, the eddy current loss at a rotation speed of 1,500 rpm was 17.7 W.

Figure 6:
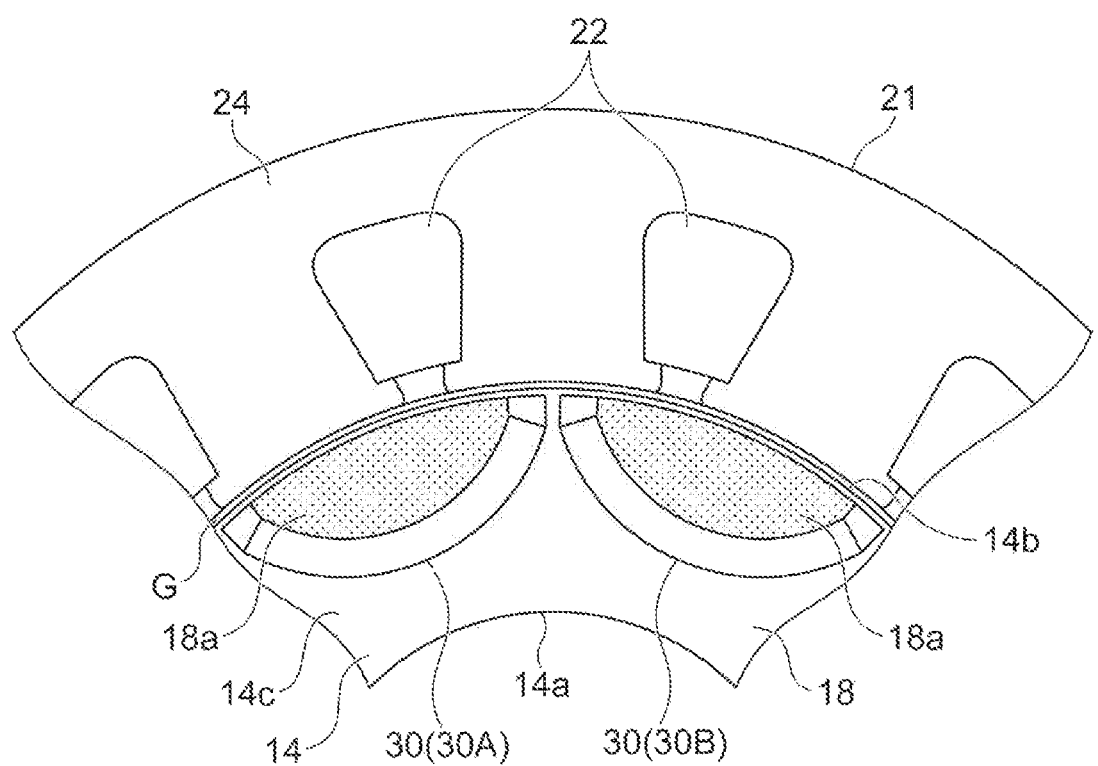
FIG. 6 is a plan view illustrating main parts of an IPM motor in a different mode.

As illustrated in FIG. 6, only the first portion 18a between each of the permanent magnets 30 and the air gap G (between the rotor and the stator) in the end surface portion 18, where an eddy current being likely to occur, may be composed of a pressed powder compact made of soft magnetic powder.

In addition, both of the end surface portions 18 forming both of the end surfaces 14c and 14d of the rotor core 14 can be a pressed powder compact made of soft magnetic powder. Only one of the end surface portions 18 forming both of the end surfaces 14c and 14d of the rotor core 14 can be a pressed powder compact made of soft magnetic powder. Since both of the end surface portions 18 forming both of the end surfaces 14c and 14d of the rotor core 14 are pressed powder compacts formed of soft magnetic powder, a deterioration in efficiency caused by an eddy current loss can be further prevented.

In the IPM motor 1, as illustrated in FIGS. 3 and 4, similar to the rotor core 14, the stator core 21 also has a main body portion 23 that holds the coils 22, and an end surface portion 24 that forms each of the end surfaces 21a and 21b of the stator core 21.

Similar to the main body portion 17 of the rotor core 14, the main body portion 23 of the stator core 21 is made of a laminated steel sheet in which a plurality of steel sheets 25 are stacked one on another in the direction of the axis X. The thickness of each of the steel sheets 25 is, for example, from 0.2 to 0.5 mm. A silicon steel sheet can be applied as the steel sheet 25. When the main body portion 23 is made of a laminated silicon steel sheet, the main body portion 23 has an electrical resistivity of approximately $5.6 \times 10^{-7}$ Ωm.

Similar to the end surface portion 18 of the rotor core 14, the end surface portion 24 of the stator core 21 is a pressed powder compact made of soft magnetic powder. Pure iron-based magnetic powder such as $Fe_3Si$ powder can be applied as the soft magnetic powder of the pressed powder compact. An average grain size (d50) of the soft magnetic powder of the pressed powder compact is, for example, from 20 to 100 μm. The pressed powder compact is obtained by binding the soft magnetic powder, and a binder such as a resin can be used for binding. The pressed powder compact can be obtained by hot compaction using the soft magnetic powder. When the end surface portion 24 is a pressed powder compact made of $Fe_3Si$ powder, the end surface portion 24 has an electrical resistivity of approximately 300 Ωm.

In the IPM motor 1 described above, a magnetic flux having a component perpendicular to the end surface of the stator core (namely, a component parallel to the axis X) is likely to occur not only in the end surface portion 18 of the rotor core 14 but also in the end surface portion 24 of the stator core 21, and an eddy current is likely to occur in the end surface portion 24 of the stator core 21. When the eddy current occurs in the stator core 21, a deterioration in motor efficiency may be caused by an eddy current loss.

In the IPM motor 1 described above, since in the stator core 21, the end surface portion 24 which is a pressed powder compact made of soft magnetic powder has a higher electrical resistivity than the electrical resistivity of the main body portion 23 made of a laminated steel sheet, compared to when the electrical resistivity of the end surface portion 24 is the same as the electrical resistivity of the main body portion 23 (for example, the entirety of the stator core 21 is made of a laminated steel sheet), the occurrence of an eddy current in the end surface portion 24 is further prevented. For this reason, in the IPM motor 1, a deterioration in efficiency caused by an eddy current loss is prevented, and an improvement in efficiency is realized.

As described above, in the IPM motor 1, since the rotor core 14 includes the end surface portion 18 having a higher electrical resistivity than the electrical resistivity of the main body portion 17, and the stator core 21 includes the end surface portion 24 having a higher electrical resistivity than the electrical resistivity of the main body portion 23, a deterioration in efficiency caused by an eddy current loss is prevented from occurring in both of the rotor core 14 and the stator core 21. However, a mode where only the rotor core 14 includes the end surface portion 18 having a higher electrical resistivity than the electrical resistivity of the main body portion 17, or a mode where only the stator core 21 includes the end surface portion 24 having a higher electrical resistivity than the electrical resistivity of the main body portion 23 may be adopted.

The rotating electrical machine according to the present disclosure is not limited to the foregoing embodiment, and can be modified in various forms.

For example, it is possible to appropriately increase or decrease the number of the poles or the number of the slots of the IPM motor. In addition, the end surface shape and the cross-sectional shape of the permanent magnet are not limited to an arch shape; however, the end surface shape and the cross-sectional shape may be a V-shape or the like, and may be a shape where the permanent magnet is divided into a plurality of segments as seen from the direction of the axis X. In the foregoing embodiment, the motor (electric motor) which is one type of rotating electrical machine has been described; however, the present disclosure can be also applied to a generator which is one type of rotating electrical machine.

What is claimed is:

1. A rotating electrical machine comprising a rotor rotatable around a predetermined axis and a stator, one of the rotor and the stator includes a magnet holding portion and the other includes a coil holding portion, a plurality of permanent magnets are placed in the magnet holding portion and a plurality of coils are placed in the coil holding portion, wherein each of the permanent magnets extends over an entire length of the magnet holding portion in an axial direction of the rotor, an end surface of the magnet holding portion protrudes further than an end surface of the coil holding portion in the axial direction of the rotor, the magnet holding portion includes a first main body portion holding each of the permanent magnets, and a first end surface portion forming the end surface of the magnet holding portion, the permanent magnets exposed in the end surface, a first portion of the first end surface portion of the magnet holding portion which is positioned between the permanent magnet and an air gap between the rotor and the stator as seen from the axial direction of the rotor has a higher electrical resistivity than an electrical resistivity of the first main body portion of the magnet holding portion, and the rest of the first end surface portion other than the first portion does not have a higher electrical resistivity than the electrical resistivity of the first main body portion of the magnet holding portion, the coil holding portion includes a second main body portion holding each of the coils, and a second end surface portion formed on an entirety of the end surface of the coil holding portion extending along a plane that is perpendicular to the axial direction, and the second end surface portion of the coil holding portion has a higher electrical resistivity than an electrical resistivity of the second main body portion of the coil holding portion.

2. The rotating electrical machine according to claim 1, wherein the first main body portion of the magnet holding portion is made of a laminated steel sheet in which a plurality of silicon steel sheets are stacked one on another in the axial direction of the rotor, and the first portion of the first end surface portion of the magnet holding portion is a pressed powder compact made of soft magnetic powder.

* * * * *